United States Patent [19]

Bowen et al.

[11] Patent Number: 4,979,791
[45] Date of Patent: Dec. 25, 1990

[54] LASER DIODE CONNECTOR ASSEMBLY

[75] Inventors: Terry P. Bowen, Etters; Randy M. Manning, New Cumberland, both of Pa.; Robert W. Roff, Westfield, N.J.; Bruce M. Graham, Hummelstown, Pa.

[73] Assignee: AMP Incorporated, Harrisburg, Pa.

[21] Appl. No.: 448,043

[22] Filed: Dec. 8, 1989

[51] Int. Cl.⁵ .............................................. G02B 6/30
[52] U.S. Cl. ............................... 350/96.17; 350/96.18
[58] Field of Search ............................ 350/96.17, 96.18

[56] References Cited

U.S. PATENT DOCUMENTS

| | | | |
|---|---|---|---|
| 4,102,559 | 7/1978 | Hunzinger | 350/96.18 |
| 4,186,996 | 2/1980 | Bowen et al. | 350/96.20 |
| 4,273,413 | 6/1981 | Bendiksen et al. | 350/96.20 |
| 4,281,891 | 8/1981 | Shinohara | 350/96.18 |
| 4,534,616 | 8/1985 | Bowen et al. | 350/96.20 |
| 4,610,746 | 9/1986 | Broer et al. | 350/96.17 |
| 4,738,508 | 4/1988 | Palmquist | 350/96.21 |
| 4,752,109 | 6/1988 | Gordon et al. | 350/96.20 |
| 4,776,663 | 10/1988 | Malinge et al. | 350/96.20 |
| 4,834,491 | 5/1989 | Aoki et al. | 350/96.20 |
| 4,875,752 | 2/1988 | Akindou | 350/96.2 |

FOREIGN PATENT DOCUMENTS 8905467 6/1989 PCT Int'l Appl. .

Primary Examiner—William L. Sikes
Assistant Examiner—Robert E. Wise
Attorney, Agent, or Firm—Gerald K. Kita

[57] ABSTRACT

A connector body 4 encircling an optical focusing element 5, a laser diode 3 having an emission axis aimed along an axis at an absorption end 6 of the focusing element 5, the focusing element 5 converting diverging optical emission of the laser diode 3 into a converging beam of radiation, and a coupler element 7 contacting the focusing element 5 without an air gap therebetween to receive the beam of radiation without backward reflection, the connector body 4 having a socket 9, and the coupler element 7 having a front end 8 in the socket 9 for physical contact with an end 10 of an optical fiber 2 disconnectably inserted in the socket 9.

12 Claims, 5 Drawing Sheets

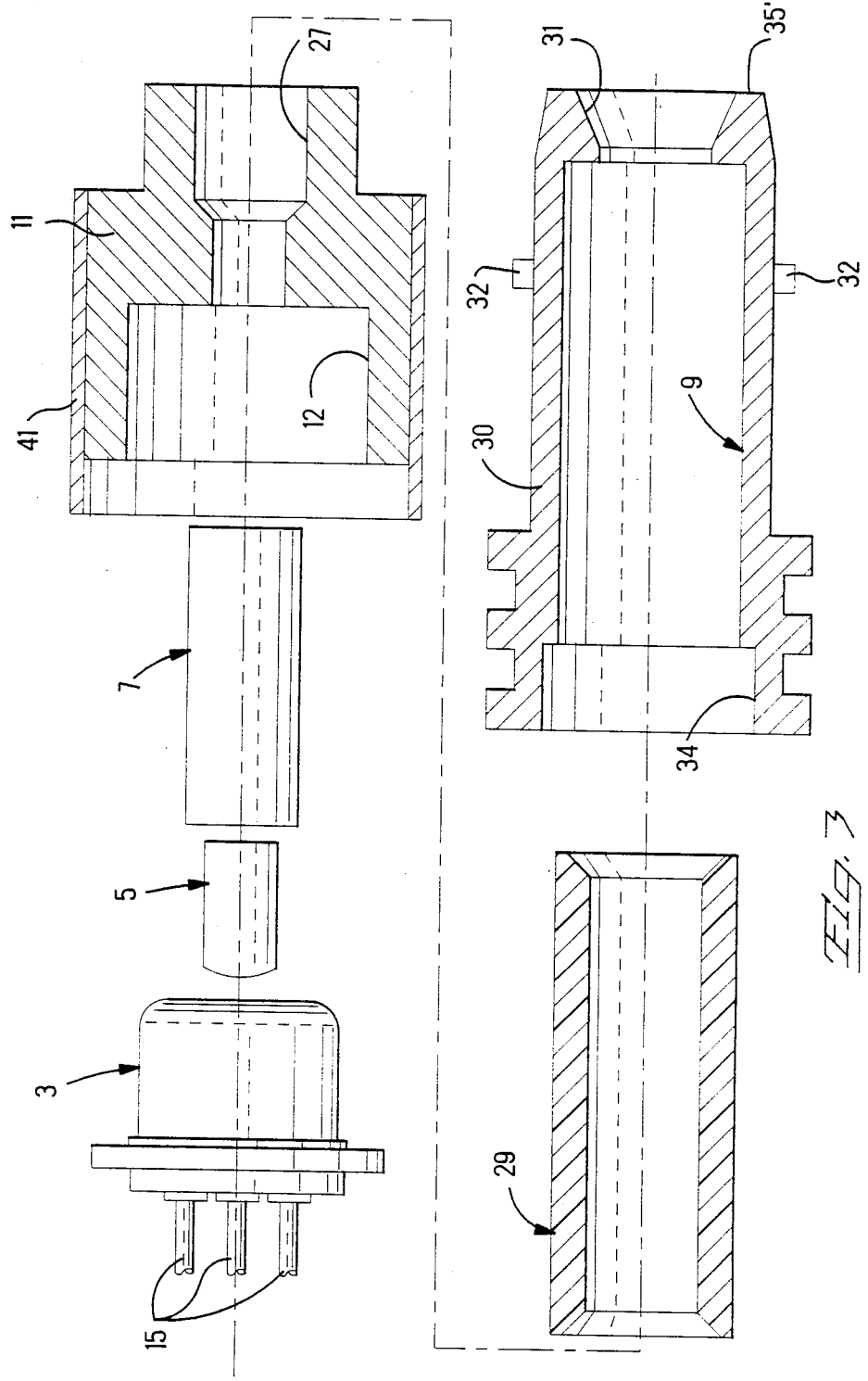

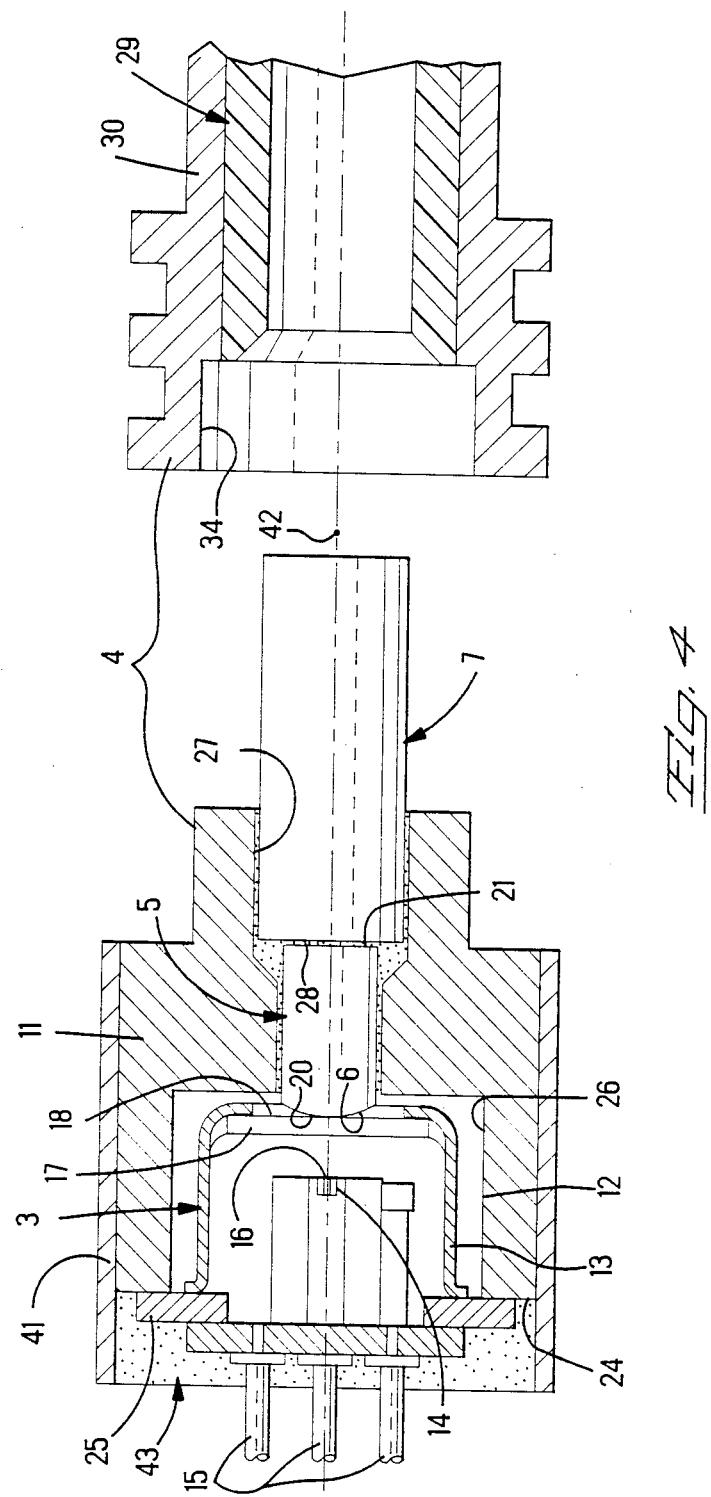

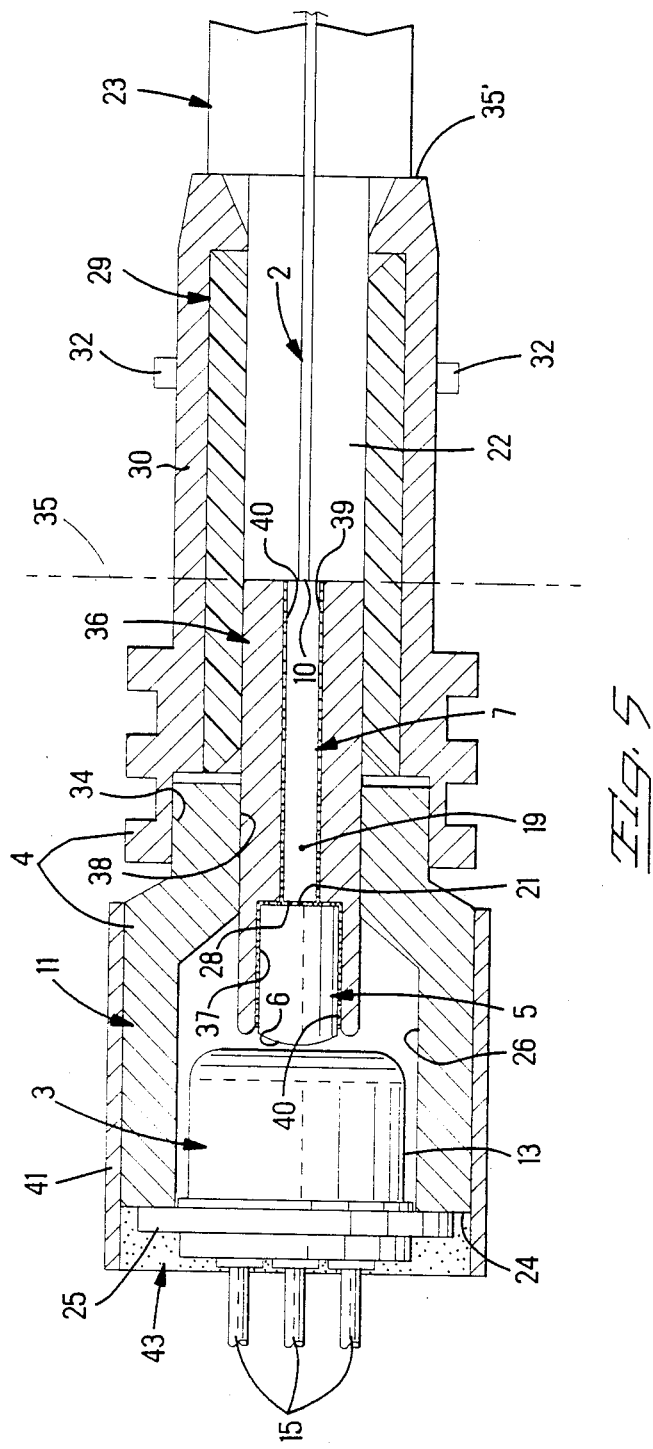

LASER DIODE CONNECTOR ASSEMBLY

FIELD OF THE INVENTION

The invention relates to a connector assembly for a laser diode, and more particularly, to a connector assembly for disconnectably coupling a laser diode and an optical fiber.

BACKGROUND OF THE INVENTION

Each of U.S. Pat. Nos. 4,186,996 and 4,273,413 and 4,534,616 discloses a connector assembly for a diode that disconnectably connects the diode to an optical fiber. In the connector assembly, optical emission from the diode is transmitted successively through different transparent materials having different indices of optical refraction. A difficulty associated with the connector assembly is that the emission is scattered at the boundary between transparent materials of different indices. Another difficulty is that the emission can reflect from surfaces of the materials or from a junction of one of the materials with an air gap. Particularly, if the diode is a laser diode, and the emission is reflected backward at low angles of incidence to the reflecting surface, such backward reflections can enter the laser diode and cause instability of the diode.

SUMMARY OF THE INVENTION

An advantage of the invention resides in a disconnect coupling of an optical device, such as an optical fiber or a lens, to a laser diode that eliminates backward reflection. A further advantage of the invention resides in a coupling of a laser diode to an optical device, such as an optical fiber or a lens, that eliminates a pigtail coupling in which bare optical fibers are coupled to a laser package, as disclosed in U.S. Pat. Nos. 4,834,491 and 4,752,109.

According to the invention, a connector assembly provides a disconnect coupling of an optical fiber to a laser diode with the same accuracy of alignment as a coupling of an optical fiber to an optical fiber, while eliminating backward reflection. The invention relates to a connector assembly comprising; a connector body encircling an optical focusing element, a laser diode having an emission axis aimed along an axis at an absorption end of the focusing element, the focusing element converting diverging optical emission of the laser diode into a converging beam of radiation, and a coupler element contacting the focusing element without an air gap therebetween to receive the beam of radiation without backward reflection, the connector body having a socket, and the coupler element having a front end in the socket for physical contact with an end of an optical fiber disconnectably inserted in the socket.

The invention will now be described, by way of example, with reference to the drawings.

DESCRIPTION OF THE DRAWINGS

FIG. 3 is an exploded perspective view of a connector assembly as shown in FIG. 1.

FIG. 4 is a view similar to FIG. 3 with parts separated from one another.

FIG. 5 is a section view of another connector assembly for disconnectably connecting an optical fiber and a laser diode.

DETAILED DESCRIPTION

Figure 1:
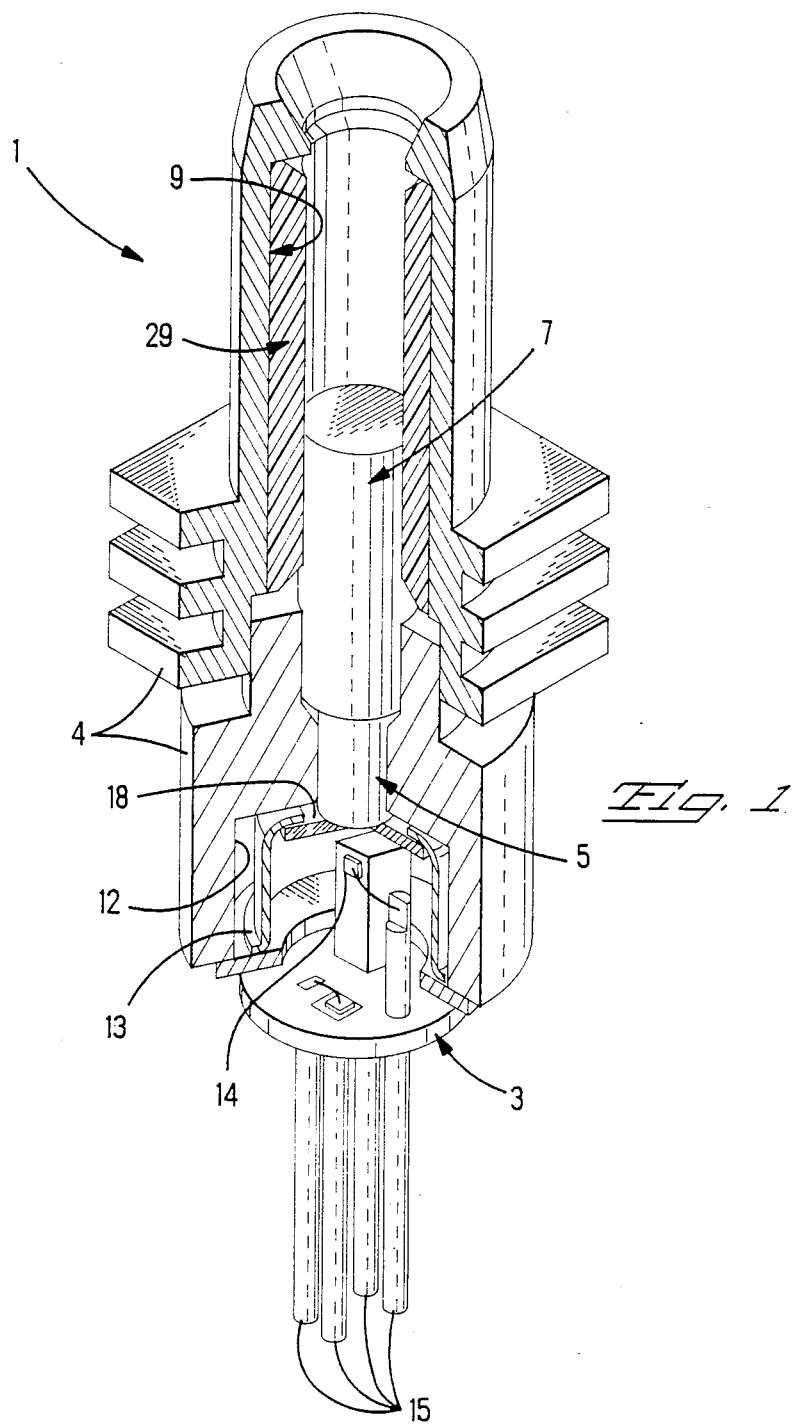
FIG 1. of the drawings is a perspective view of a connector assembly for disconnectably connecting an optical fiber and a laser diode.
Figure 2:
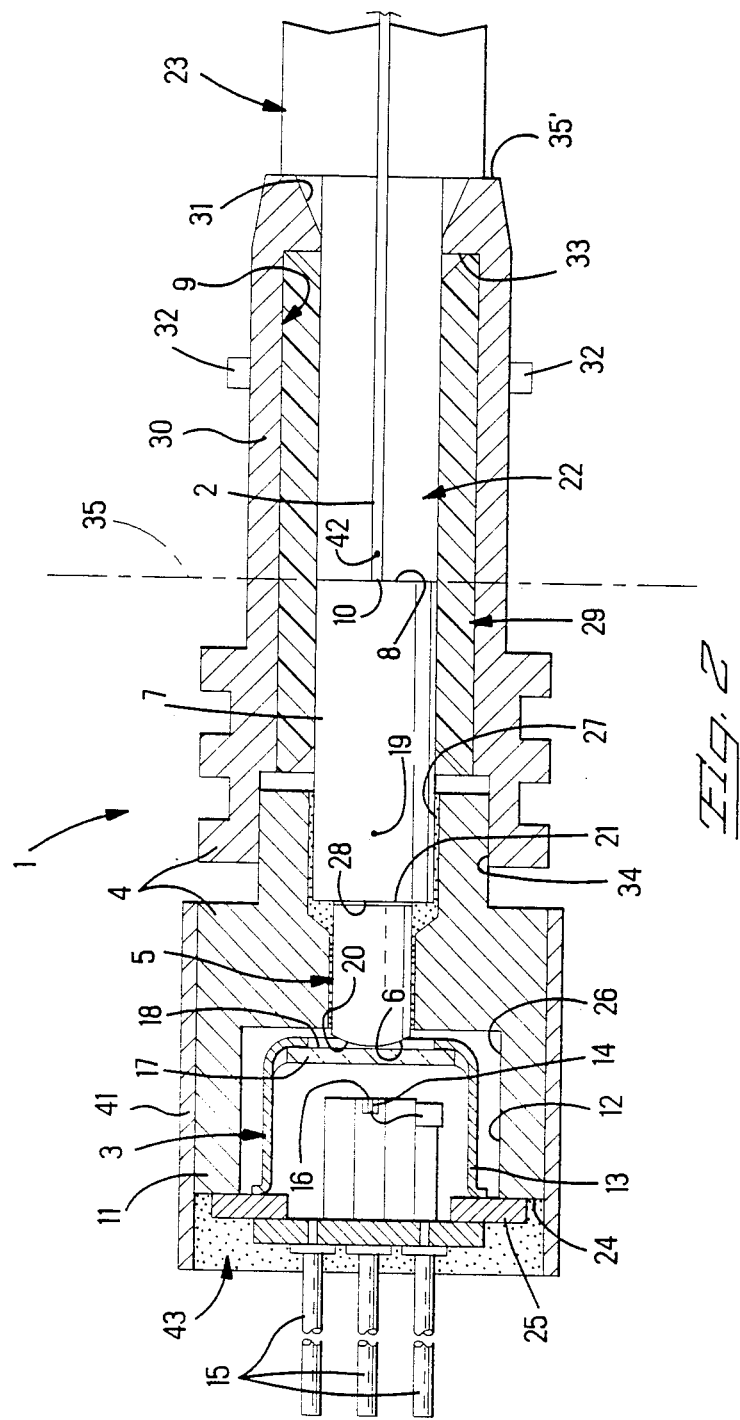
FIG. 2 is a section view of the connector assembly shown in FIG. 1.

With more particular reference to FIGS. 1 and 2, a connector assembly 1 for disconnectably coupling an optical fiber 2 and a laser diode 3 includes a connector body 4, the laser diode 3, an optical focusing element 5 having an absorption end 6 facing the laser diode 3 and converting a diverging optical beam into a converging beam of optical energy, and an optical coupler element 7 receiving the beam. The optical focusing element 5 and the optical coupler element 7 are transparent, meaning that they are transmissive of optical energy emitted from the laser diode 3. A front end 8 of the coupler element 7 is at a precise depth in a socket 9 of the connector body 4 for physical contact with an end 10 of an optical fiber 2 disconnectably inserted into the socket 9. The coupler element 7 and the focusing element 5 are in physical contact to eliminate backward reflection of converging optical energy. The coupler element 7 is in physical contact with the optical fiber 2 to eliminate backward reflection of the focused beam of radiation from the optical fiber 2.

With reference to FIGS. 2 and 4, the connector body 4 includes a rear portion 11 with an axially extending, stepped bore 12. The laser diode 3 is commercially available from Lytel Incorporated, 61 Chubb Way, Somerville, N.J. 08876. The laser diode 3 has a cylindrical package, called a can 13, enclosing a known semiconductor 14 with a laser architecture, and known electronic circuitry, not shown, that controls the operation of the laser diode 3. Electrical leads 15 of the circuitry project from a rear of the can 13 for connection to a printed circuit board, not shown. An emission edge 16 or emission facet of the semiconductor 14 faces a window 17, AR coated in both sides, of the can 13 at an emission end 18 of the laser diode 3. The emission end 18 of the laser diode 3 emits optical energy comprised of a conical diverging beam of large numerical aperture. It is an objective to change the large numerical aperture diverging beam into a small numerical aperture converging beam having a relatively small diameter that is readily matched to the beam acceptance conditions of an optical fiber 2.

The focusing element 5 is a GRIN lens, meaning, a gradient refractive index lens that will absorb a beam of optical radiation, and will transform and would converge the beam toward a focal point 19 located at a focal length of the focusing element 5 if the beam were to exit into air. A commercial source for the GRIN lens is Nippon Sheet Glass America, Inc., 28 World's Fair Drive, Somerset, New Jersey 08873. The absorption end 6 of the focusing element 5 is convex and has an exterior AR coating 20, meaning, antireflective coating. The convex, absorption end 6 absorbs the diverging beam of optical radiation, and transforms the absorbed beam into a converging beam. By addition of the coupler element 7, the converging beam will be focused to a focal point 42 beyond an emitting end 8 of the coupler element 7. The focused beam converges at a point well beyond the in air focal point 19. The beam at the focal point 42 is magnified, meaning, that it has a cross section of magnified size as compared with the size of the source emission at the emission end 18 of the laser diode 3, and it has a lower numerical aperture than that of the diverging beam from the laser diode 3 and also lower numerical aperture than would have been achieved in air at focal point 19.

The coupler element 7 is a high purity silica rod commercially available from Polymicro Technologies, 3035 North Thirty Third Drive, Phoenix, Ariz. 85017. The coupler element 7 is in physical contact with the emitting end 21 of the focusing element 5 without an air gap therebetween, thereby to eliminate backward reflection of the converging beam as it is absorbed by the coupler element 7. A transparent adhesive, 28 is used, and will bond the focusing element 5 and the coupler element 7 without an air gap. The coupler element 7 absorbs the converging beam and transmits the magnified, converging beam into the diameter of an optical fiber 2 held in a concentric ferrule 22 or plug of a complementary connector assembly 23, known, for example, in U.S. Pat. No. 4,738,508.

The length of the coupler element 7 is selected so that as the spot size gradually reduces along the length of the coupler element 7 it attains a spot size substantially equal to the diameter of the core of the optical fiber 2 at its end face 8. The coupler element 7 has an index of optical refraction greater than that of air, and will refract the converging beam into a more gradually converging beam of higher magnification than if the beam were allowed to exit into air. An increased amount of the gradually converging beam is at low angles with respect to the axis of transmission, and is successfully launched into the optical fiber 2. Portions of the converging beam that are launched into the optical fiber 2 at relatively steep angles to the axis of transmission of the optical fiber 2 will not be successfully launched, but will escape. The coupler element 7, thus, provides reduced launch angles for the beam as compared with steeper launch angles if the same beam were to be transmitted by the focusing element 5 into air.

Assembly of the connector assembly 1 is accomplished by first assembling the focusing element 5 and the coupler element 7 with a light curing transparent adhesive 28 within the rear portion 11 of the connector body 4. The absorption end 6 of the focusing element 5 is precisely located a fixed distance from a rear facing, positioning surface 24 of the rear portion 11 of the connector body 4 at this stage of assembly.

The focusing element 5 and the coupler element 7 have close fits in the stepped bore 27 of the rear portion 11. The coupler element 7 is in physical contact with the emitting end 21 of the focusing element 5. Such physical contact is established by a film of light curing transparent adhesive 28 joining the coupler element 7 and the focusing element 5 without an air gap. A flange 25 of the laser diode 3 is held against the positioning surface 24, to locate the laser diode 3 at a precise distance from the absorption end 6 of the focusing element 5. The laser diode can 13 has a loose fit in an open rear end 26 of the rear portion 11. The electrical leads 15 project from the rear of portion 11. The position of the laser diode 3 is adjusted within the open rear end 26, while the laser diode 3 is operating, until the laser emission is detected to be symmetrical about the axes of the combined focusing element 5 and the coupling element 7, giving optimum coupling into optical fiber 2. Then the laser diode 3 is secured to the rear portion 11, for example, by laser welding the intersection of the flange 25 and the positioning surface 24 of rear portion 11. To complete the assembly, a metal sleeve 41 encircles the rear portion 11 and projects rearwardly from the rear end of the rear portion 11 to encircle and protect the weld joint. A structural adhesive 43 is used to encapsulate the rear portion 11 to complete the assembly. An alignment sleeve 29, as described in U.S. Pat. No. 4,738,508, is slidable axially within an interior of a front portion 30 of the connector body 4. The open socket 9 at a front end 35', of the body 4 has a flared, funnel opening 31 to receive the ferrule 22 of the complementary connector assembly 23. Bayonet coupling pins 32 project from an exterior of the front portion 30 for connection to the complementary connector assembly 23. An internal, rear facing shoulder 33 limits forward movement of the alignment sleeve 29.

The rear portion 11 is press fit within an open rear end 34 of the front portion 30 of the connector body 4. The coupler element 7 projects forwardly from the rear portion 11, and is received slidably within the interior of the alignment sleeve 29. The rear portion 11 is advanced into position until the front, emitting end 21 of the coupler element 7 is precisely located at a reference plane 35 positioned within the connector body 4 a precise distance from the front end 35', to establish physical contact with a front face or end 10 of the optical fiber 2 at the reference plane 35 without exerting excessive pressure.

The front face or end 10 of the optical fiber 2 would be a detrimental source of reflection of low angle, laser emission back to the laser diode 3 if coupling in air. Physical contact between the coupler element 7 and the end 10 of the optical fiber 2 eliminates such reflection, and provides a coupling with the same accuracy of alignment as a coupling of an optical fiber to another optical fiber. The coupler element 7 and the alignment ferrule 22 have the same external dimension, such that the sleeve 29 aligns the exteriors of the coupler element 7 and the alignment ferrule 22, to align the front end 10 of the optical fiber 2 axially with the axis of the coupler element 7.

In FIG. 5, the focusing element 5 and the coupler element 7 are encircled by a sleeve 36 having the same diameter as the alignment ferrule 22. The focusing element 5 is secured by light cured adhesive in an open rear end 37 of the sleeve 36. The sleeve 36 is assembled along an open front end 38 of the rear portion 11 of the connector body 4. The complementary connector 23 is temporarily coupled to the emitting end of the coupler element 7. The laser diode 3 is activated. The emission is monitored by the coupler element 7. The sleeve 36 is adjusted in position toward and away from the laser diode 3 until relative maximum power coupled into the complementary connector 23 is detected. Then the sleeve 36 is secured in place by a press fit in the rear portion 11, or by welding the sleeve 36 and the rear portion 11. The laser diode 3 is adjusted in position along transverse axes until, again, relative maximum power coupled into the complementary connector 23 is detected. Then the laser diode 3 is secured in place. The laser diode 3 is secured in the rear portion 11 as described above. The coupler element 7 has a close fit in an open front end 39 of the sleeve 36. The coupler element 7 is secured to the sleeve 36 by a cylindrical film of light cured adhesive 40, and is in physical contact with the emitting end 21 of the focusing element 5. The rear portion 11 is press fit within the open rear end 34 of the front portion 30 of the connector body 4. The sleeve 36 and the coupler element 7 project forwardly from the rear portion 11, and are received slidably within the interior of the alignment sleeve 29. The rear portion 11 is advanced into position until the front, emitting end 21 of the coupler element 7 is precisely located at the reference plane 35 positioned within the connector body 4 a precise distance from the front end 35', to establish physical contact with a front face or end 10 of the optical fiber 2 at the reference plane 35 without exerting excessive pressure. The alignment sleeve 29 aligns the exteriors of the sleeve 36 and the alignment ferrule 22, which have external diameters of the same dimension. To complete the assembly, a metal sleeve 41 encircles the rear portion 11 and projects rearwardly from the rear end of the rear portion 11 to encircle and protect the weld joint. A structural adhesive 43 is used to encapsulate the rear portion 11 to complete the assembly.

We claim:

1. A connector assembly comprising; a connector body encircling an optical focusing element, a laser diode having an emission axis aimed along the axis of the optical focusing element, the focusing element converting diverging optical emission of the laser diode into a converging beam of radiation, and a coupler element aligned with the focusing element without an air gap therebetween to receive the beam of radiation without backward reflection, the connector body having a socket, and the coupler element having a front end in the socket for physical contact with an end of an optical fiber disconnectably inserted in the socket.

2. A connector assembly as recited in claim 1, and further comprising; a coating of antireflective material on the focusing element facing the laser diode.

3. A connector assembly as recited in claim 1, and further comprising; adhesive intimately joined to the focusing element and to the coupler element without an air gap.

4. A connector assembly as recited in claim 1, and further comprising; adhesive intimately joined to the focusing element and to the coupler element, the adhesive and the coupler element having substantially the same index of optical refraction.

5. A connector assembly as recited in claim 1, and further comprising; the front end of the coupler element providing a stop surface limiting a depth of insertion of an optical fiber disconnectably inserted in the socket.

6. A connector assembly as recited in claim 1, and further comprising; an alignment sleeve in the socket, and an open end of the alignment sleeve facing toward an open end of the socket and receiving the end of an optical fiber disconnectably in the socket.

7. A connector assembly as recited in claim 1, and further comprising: the length of the coupler element extends beyond the in air focal point of the focusing element, and the coupler element focusing the converging beam to a second focal point beyond the front end of the coupler element.

8. A connector assembly as recited in claim 1, and further comprising; a rear portion of the connector body securing the laser diode, the focusing element and the coupler element, and front portion of the connector body encircling the coupler element and being secured to the rear portion such that the front end of the coupler element is at a precise location in the front end and provides a stop surface limiting a depth of insertion of an optical fiber disconnectably inserted in the socket.

9. A connector assembly for disconnectably coupling an optical fiber and a laser diode comprises; a transparent focusing element having an absorption end facing a laser diode and converting diverging optical signals into a converging beam of optical energy, a transparent coupler element receiving the beam, a front end of the coupler element at a precise depth in a socket for disconnectable physical contact with an end of an optical fiber disconnectably inserted into the socket, and the optical fiber, the coupler element and the focusing element in physical contact to eliminate backward reflection of converging optical energy.

10. A method for assembling a connector assembly, comprising the steps of;

encircling a focusing element with a rear portion of a connector body, aligning an emission portion of a laser diode with an axis of an absorption end of the focusing element and securing the laser diode to the connector body, aligning a transparent coupling element along the axis of the connector body and in contact with the focusing element without an air gap, and adjustably positioning an open front end of the connector body at a fixed distance from the front end of the coupler for physical contact with an end of an optical fiber disconnectably inserted in the socket.

11. A method as recited in claim 10, comprising the steps of;

assembling the focusing element and the coupling element in contact with each other within a sleeve prior to aligning the coupling element along the axis of the connector body, aligning the sleeve and the focusing element together with the coupling element along the axis of the connector body, securing the sleeve in place, and adjusting the position of the laser diode along transverse axes prior to securing the laser diode into the connector body.

12. A connector assembly comprising: a connector body encircling an optical focusing element, a laser diode having an emission axis aimed along the axis of the optical focusing element, the focusing element converting diverging optical emission of the laser diode into a converging beam of radiation, a coupler element aligned with the focusing element, the connector body having a socket, and the coupler element having an emitting end in the socket for physical contact with an end of an optical fiber disconnectably inserted in the socket, the coupler element extending beyond the in air focal point of the focusing element and focusing the converging beam to a focal point beyond the emitting end.

* * * * *